(12) United States Patent
Monier et al.

(10) Patent No.: US 11,812,374 B2
(45) Date of Patent: Nov. 7, 2023

(54) TIME-MULTIPLEXING OF MULTIPLE LISTENING SCHEDULES AND PHYSICAL LAYER MODES IN A MESH NETWORK

(71) Applicant: ITRON, INC., Liberty Lake, WA (US)

(72) Inventors: Fabrice Monier, Bry sur Marne (FR); Jerome Bartier, Edinburgh (GB); Yacine Khaled, Meudon (FR); Imad Jamil, Beynes (FR); Khalid Maallem, Meudon (FR); Samuel De Vals, Louveciennes (FR)

(73) Assignee: ITRON, INC., Liberty Lake, WA (US)

( * ) Notice: Subject to any disclaimer, the term of this patent is extended or adjusted under 35 U.S.C. 154(b) by 59 days.

(21) Appl. No.: 17/527,051

(22) Filed: Nov. 15, 2021

(65) Prior Publication Data
US 2023/0156582 A1    May 18, 2023

(51) Int. Cl.
| | |
|---|---|
| *H04W 48/10* | (2009.01) |
| *H04W 48/00* | (2009.01) |
| *H04L 5/00* | (2006.01) |
| *H04B 1/7143* | (2011.01) |
| *H04W 72/0446* | (2023.01) |
| *H04B 1/7183* | (2011.01) |

(52) U.S. Cl.
CPC .......... *H04W 48/17* (2013.01); *H04B 1/7143* (2013.01); *H04B 1/7183* (2013.01); *H04L 5/0005* (2013.01); *H04W 48/10* (2013.01); *H04W 72/0446* (2013.01)

(58) Field of Classification Search
CPC . H04L 27/26025; H04L 5/0005; H04W 48/10

USPC ............................... 370/329, 400, 401, 403
See application file for complete search history.

(56) References Cited

U.S. PATENT DOCUMENTS

| | | | |
|---|---|---|---|
| 9,763,189 B2 * | 9/2017 | Ang ................... | H04W 52/0293 |
| 11,553,522 B1 * | 1/2023 | Shukla .............. | H04W 72/0446 |
| 2020/0296781 A1 | 9/2020 | Fraser | |

(Continued)

FOREIGN PATENT DOCUMENTS

| | | |
|---|---|---|
| DE | 112018006743 T5 | 10/2020 |
| KR | 1020170094195 A | 8/2017 |
| WO | 2016/094446 A1 | 6/2016 |

(Continued)

OTHER PUBLICATIONS

Partial Search Report for Application No. PCT/US2022/049578 dated Mar. 14, 2023.

(Continued)

*Primary Examiner* — Dang T Ton
(74) *Attorney, Agent, or Firm* — Artegis Law Group, LLP

(57) ABSTRACT

Various embodiments disclose a method that includes: attempting to detect, with a first transceiver associated with a first node, a network discovery signal, wherein the attempting is performed according to (a) a first listening schedule associated with a first physical layer mode and (b) a second listening schedule associated with a second physical layer mode; detecting, with the first transceiver, the network discovery signal during a slot associated with the first listening schedule; and in response to detecting the network discovery signal, establishing, with the first node, a connection between the first node and the second node using the first physical layer mode.

20 Claims, 7 Drawing Sheets

(56) References Cited

U.S. PATENT DOCUMENTS

2023/0037493 A1* 2/2023 Wu ...................... H04W 24/08

FOREIGN PATENT DOCUMENTS

| WO | 2019/133048 A1 | 7/2019 |
| WO | 2020/257735 A1 | 12/2020 |
| WO | 2021/136379 A1 | 7/2021 |

OTHER PUBLICATIONS

International Search Report for Application No. PCT/US2022/049578 dated May 23, 2023.

* cited by examiner

TIME-MULTIPLEXING OF MULTIPLE LISTENING SCHEDULES AND PHYSICAL LAYER MODES IN A MESH NETWORK

BACKGROUND

Field of the Various Embodiments

The various embodiments relate generally to wireless network communications, and more specifically, to time-multiplexing of multiple listening schedules and physical layer modes in a mesh network.

Description of the Related Art

A mesh network typically includes multiple electronic devices (referred to herein as "nodes") that are organized in a mesh topology and connect to one another either directly or indirectly in a dynamic, non-hierarchical fashion. In a mesh network, the nodes cooperate with one another to route data to and from the different nodes within the network as well as to and from devices outside the network. Mesh networks are becoming increasingly common in a wide variety of applications, including, and without limitation, home security and home automation systems, home network systems, smart grid systems, and other "Internet-of-Things" systems.

During operation, the nodes of a mesh network are communicatively coupled to each other by a wireless link, and communicate with each other using a technique known as "channel hopping." With channel hopping, a given node periodically transitions between different channels. The particular sequence of channels across which a given node transitions is referred to as a "channel-hopping sequence," a "channel schedule," or a "listening schedule." In the channel-hopping sequence or listening schedule, each channel in the sequence is associated with a respective time slot. As part of the normal operation of a mesh network, a given node can discover the listening schedules of neighboring nodes in the mesh network.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
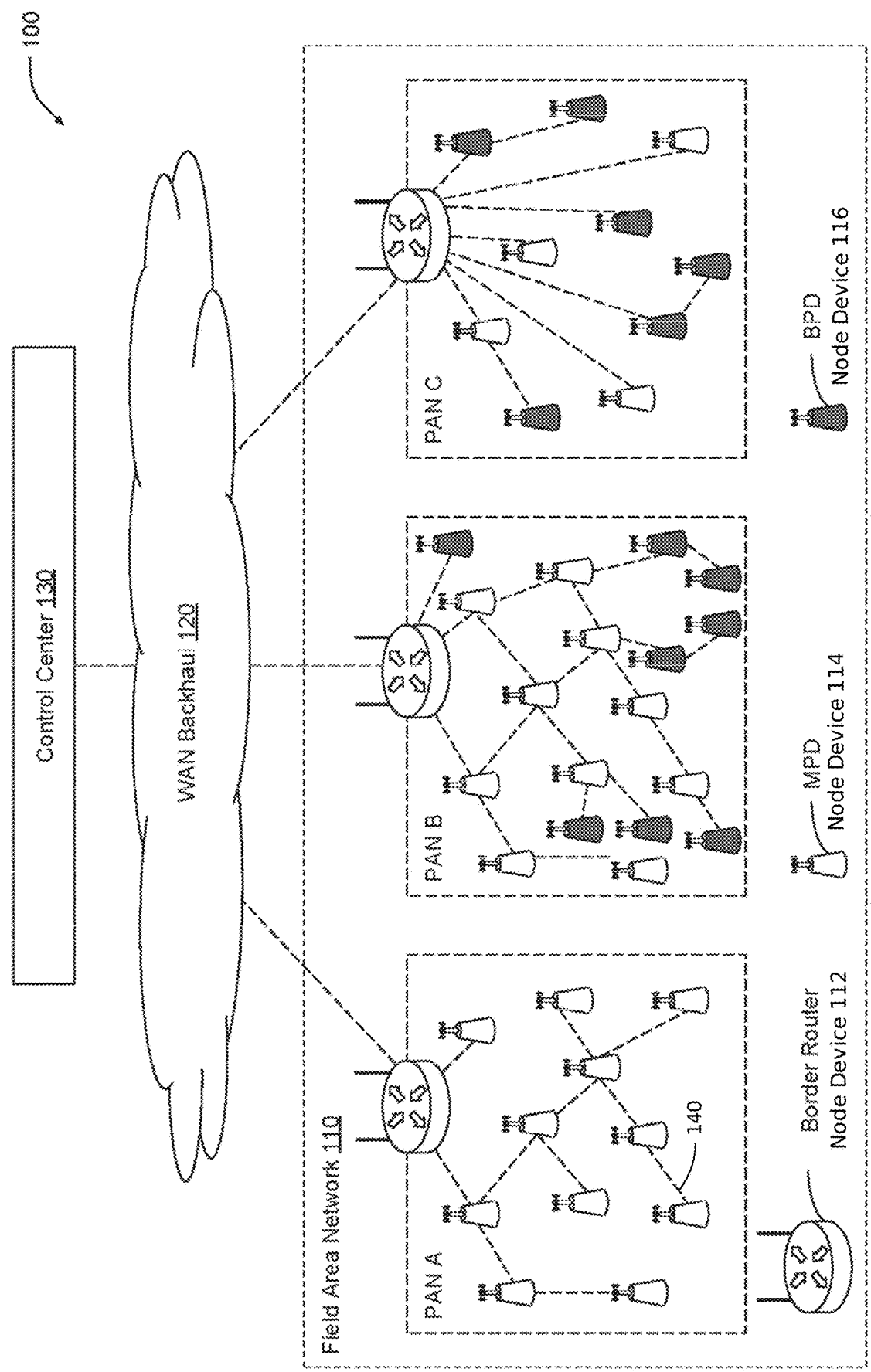
FIG. 1 illustrates a network system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

For a particular node to establish a wireless link with one or more neighbor nodes and join a mesh network, the node must be in range of at least one node of the mesh network. In addition, the joining node should be configured to establish a link with nodes of the mesh network via a suitable physical layer protocol (or physical mode), such as a prescribed frequency and data rate, using an appropriate listening schedule. To that end, devices that are intended to function as a node of a mesh network are usually configured with a default physical mode for communication within a mesh network.

Generally, the default physical mode of a node is set to optimize the trade-off between the higher performance associated with a high data rate and the longer range and reliability associated with a low data rate. However, if the joining node is located too far from the nearest neighbor node and/or is subject to too much signal noise, a reliable link cannot be established between the joining node and the mesh network. As a result, the joining node remains orphaned and cannot join the mesh network unless relocated closer to the mesh network, and/or a range extender or closer node is added to the mesh network that brings the joining node within range of the default physical mode. Consequently, the addition of a node to a mesh network using only a default physical node can leave nodes orphaned.

To address these shortcomings, various techniques disclosed herein enable a node device to join a mesh network. In some embodiments, a node device that is included in the mesh network attempts to detect a network discovery signal from the joining node device using a hybrid listening schedule. The hybrid listening schedule time-multiplexes a first listening schedule associated with a first physical layer mode (such as a default physical layer mode) and a second listening schedule associated with a second physical layer mode (such as a long-range physical layer mode). In some embodiments, a node device attempts to join a mesh network with a single transceiver by performing a discovery operation that time-multiplexes transmission of a first network discovery signal associated with a first physical layer mode of the node device (for example the default physical layer mode) with transmission of a second network discovery signal associated with a second physical layer mode of the node device (for example the long-range physical layer mode). In some embodiments, the node device initially attempts to join the mesh network with transmission of the first network discovery signal using the default physical layer mode before attempting to join the mesh network with the discovery operation that time-multiplexes transmission of the first network discovery signal with transmission of the second network discovery signal.

At least one technical advantage of the disclosed techniques relative to the prior art is that, with the disclosed techniques, a node can join a wireless network when positioned outside the effective range of a default physical layer mode of nodes within the mesh network. A further advantage is that, as conditions change over time in the mesh network, nodes can quickly and automatically select the best-performing physical layer mode from multiple available physical layer modes, where in some instances the best-performing physical layer mode has a lower performance than the default physical layer mode of the wireless network. These technical advantages provide one or more technological improvements over prior art approaches.

System Overview

FIG. 1 illustrates a network system configured to implement one or more aspects of the various embodiments. As shown, network system 100 includes, without limitation, field area network (FAN) 110, wide area network (WAN) backhaul 120, and control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116. Network system 100 includes a plurality of node devices that are configured to communicate with each other according to the techniques described herein.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, can power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices or node devices that are at a distance of one hop (also referred to as neighbors or neighbor node devices) via bi-directional communication links. In many instances, neighbor node devices may be physically closer than other node devices in network system 100, while in other instances, this is not the case, for example due to physical barriers that impede communication between physically proximate node devices. In various embodiments, a given communication link may be wired or wireless links, although in practice, adjacent node devices of a given PAN exchange data with one another by transmitting data packets via wireless radio frequency (RF) communications. The various node device types are configured to perform a technique, known in the art as "channel hopping," in order to periodically receive data packets on varying channels. As known in the art, a "channel" may correspond to a particular range of frequencies. In one embodiment, a node device computes a current "transmit" or "receive" channel by evaluating a Jenkins hash function that is based on a total number of channels, the media access control (MAC) address of the node device, and/or other information associated with the node device. Alternatively or additionally, in some embodiments, a node device determines a transmit or receive channel based on a listening schedule associated with an adjacent neighbor node device.

In operation, each node device within a given PAN can implement a discovery protocol to identify one or more adjacent node devices or "neighbor node devices." In such instances, a node device that has identified an adjacent, neighboring node device may establish a bi-directional communication link 140 with the neighboring node device. Each neighboring node device can update a respective neighbor table to include information concerning the other node device, including the MAC address of the other node device, as well as a received signal strength indication (RSSI) of communication link 140 established with that node device. In various embodiments, the neighbor table can include information about one or more communication modes (referred to herein as physical layer modes) that the neighbor node device is capable of supporting. Each physical layer mode can be associated with one or more different operating parameters (e.g., data rates, modulation scheme, channel spacing, frequencies supported, listening schedule, etc.).

Node devices can compute the listening schedules of adjacent node devices in order to facilitate successful transmission of data packets to such node devices. In embodiments where node devices implement the Jenkins hash function, a node device may compute a "current receive" channel of an adjacent node device using the total number of channels, the MAC address of the adjacent node device, and/or a time slot number assigned to a current time slot of the adjacent node device.

Any of the node devices discussed above can operate as a source node device, an intermediate node device, or a destination node device for the transmission of data packets. In some embodiments, a given source node device can generate a data packet and then, (in mesh network topologies), transmit the data packet to a destination node device via any number of intermediate node devices. In such instances, the data packet may indicate a destination for the packet and/or a particular sequence of intermediate node devices to traverse in order to reach the destination node device. In some embodiments, each intermediate node device can include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes can exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines can query node devices within network system 100 to obtain various data, including raw and/or processed sensor data, power consumption data, node/network throughput data, status information, and so forth. The server machines can also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

Figure 2:
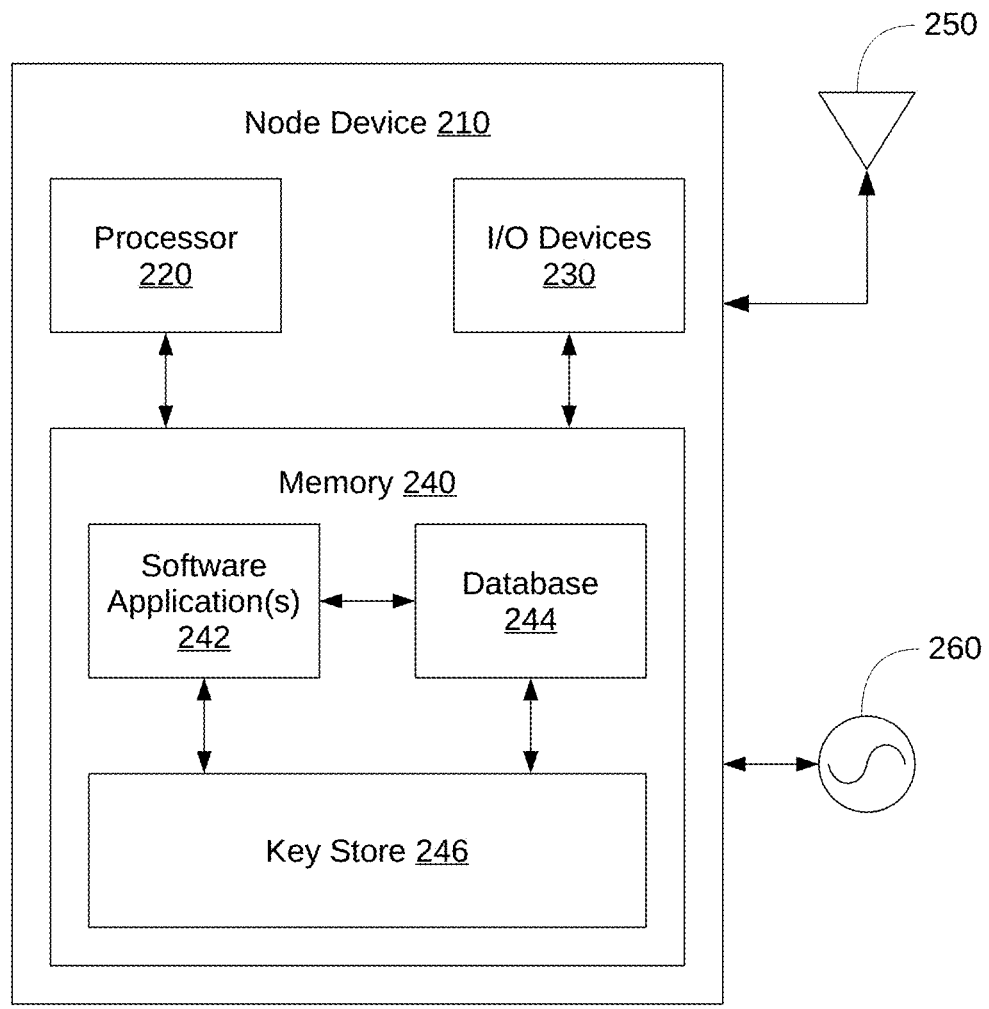
FIG. 2 illustrates a node device configured to transmit and receive data within the network system of FIG. 1, according to various embodiments.

In various embodiments, node devices 112, 114, 116 can include computing device hardware configured to perform processing operations and execute program code. Each node device can further include various analog-to-digital (A/D) converters, digital-to-analog (D/A) converters, digital signal processors (DSPs), harmonic oscillators, transceivers, and/or any other components generally associated with RF-based communication hardware. FIG. 2 illustrates an exemplary node device that can operate within the network system 100.

Node Device

FIG. 2 illustrates a node device configured to transmit and receive data within the network system 100 of FIG. 1, according to various embodiments. As shown, node device 210 is coupled to transceiver 250 and oscillator 260. Node device 210 includes, without limitation, a processor 220, input/output devices 230, and memory 240. Memory 240 includes one or more applications (e.g., software application 242) that communicate with database 244.

Processor 220 coordinates the operations of node device 210. Transceiver 250 is configured to transmit and/or receive data packets and/or other messages across network system 100 using a range of channels and power levels. Oscillator 260 provides one or more oscillation signals, according to which, in some embodiments, node device 210 may schedule the transmission and reception of data packets. In some embodiments, node device 210 can be used to implement any of border router node devices 112, MPD node devices 114, and/or BPD node devices 116 of FIG. 1.

In various embodiments, processor 220 can include any hardware configured to process data and execute software applications. Processor 220 may include a real-time clock (RTC) (not shown) according to which processor 220 maintains an estimate of the current time. The estimate of the current time can be expressed in Universal Coordinated Time (UTC), although any other standard of time measurement can also be used. I/O devices 230 include devices configured to receive input, devices configured to provide output, and devices configured to both receive input and provide output. Memory 240 can be implemented by any technically-feasible computer-readable storage medium.

Memory 240 includes one or more software applications 242 and database 244, coupled together. The one or more software applications includes program code that, when executed by processor 220, can perform any of the node-oriented computing functionality described herein. The one or more software applications 242 can also interface with transceiver 250 to coordinate the transmission and/or reception of data packets and/or other messages across network system 100, where the transmission and/or reception is based on timing signals generated by oscillator 260. In various embodiments, memory 240 can be configured to store protocols used in physical layer modes, equations and/or algorithms for identifying metric values, constants, data rate information, listening schedules, and other data used in identifying metric values, etc. Memory 240 can also include a key store 246 where keys for encryption and/or decryption of communications (e.g., messages) between node devices can be stored.

In operation, software application(s) 242 can implement various techniques to optimize communications with one or more linked node devices, such as a neighbor node device. In various embodiments, node device 210 can be configured to, using a plurality of different communication modes, transmit data messages to the linked node device and/or receive data messages from the linked node device by selecting a common communication mode (such as a physical layer mode) that is supported by node device 210 and the linked node device (e.g., any of border router node devices 112, MPD node devices 114, and/or BPD node devices 116 of FIG. 1). More generally, node device 210 can be configured for multi-mode communications. Node device 210 can communicate with a linked node or with control center 130 using any of a plurality of modes. The particular mode used for a given transmission depends on the particular circumstances of the transmission (e.g., the type of data message, the intended recipients of the data message, etc.). Examples of the modes include, without limitation, unicast, broadcast, and multi-cast.

Hybrid Listening Schedule Using Multiple Physical Layer Modes

According to various embodiments, a node device that cannot communicatively link to any nodes of a mesh network via a default physical layer mode attempts to join the network via a long-range physical layer mode. An example embodiment is depicted in FIG. 3A.

Figure 3A:
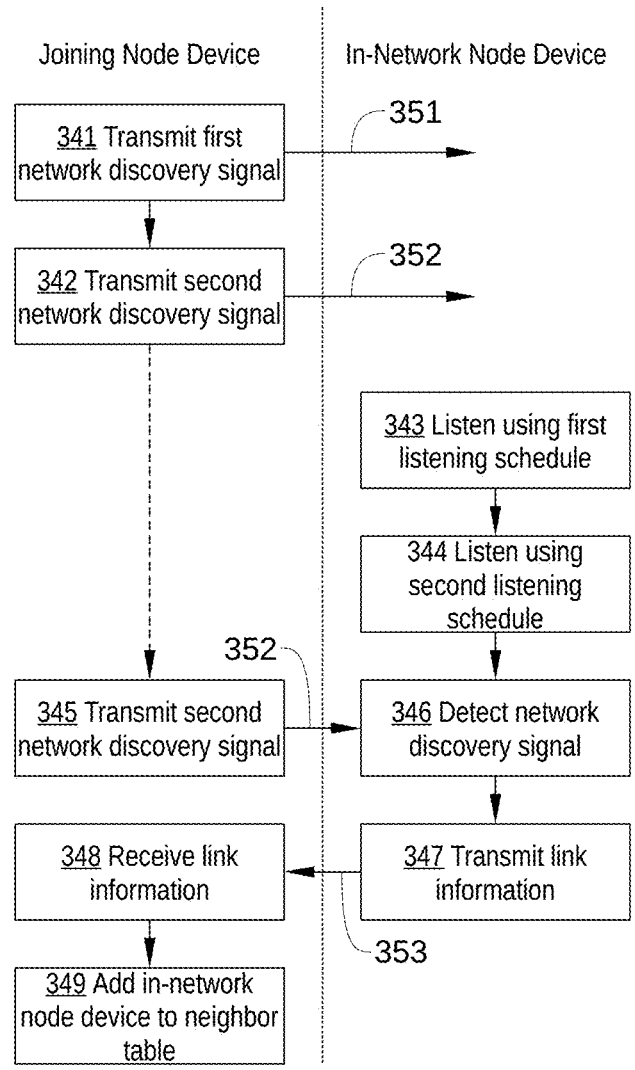
FIG. 3A is a diagram schematically illustrating a discovery technique using a hybrid listening schedule, according to various embodiments.

FIG. 3A schematically illustrates a discovery technique using a hybrid listening schedule, according to various embodiments. In the embodiment illustrated in FIG. 3A, a joining node device attempts to join the mesh network by performing a discovery operation that time-multiplexes transmission of a first network discovery signal 351 associated with a first physical layer mode of the node device (for example a default physical layer mode) with transmission of a second network discovery signal 352 associated with a second physical layer mode of the node device (for example a long-range physical layer mode). In addition, one or more in-network node devices (node devices already included in the mesh network) attempt to detect a network discovery signal (e.g., first network discovery signal and/or second network discovery signal 352) from other node devices (e.g., the joining node device) using a hybrid listening schedule. The hybrid listening schedule time-multiplexes a first listening schedule that is associated with the first physical layer mode and a second listening schedule that is associated with a second physical layer mode.

In step 341, the joining node device transmits first network discovery signal 351 via a first physical layer mode of the joining node device. In step 342, the joining device switches to a second physical layer mode of the joining node device and transmits second network discovery signal 352 after not receiving a response to the first network discovery signal 351. The joining node device then continues to alternately transmit first network discovery signal 351 and second network discovery signal 352. In step 434, an in-network node device listens using a first listening schedule, for example via a first physical layer mode of the in-network node device. In step 344, the in-network node device switches to a second physical layer mode of the in-network node device and listens using a second listening schedule, for example via a second physical layer mode of the in-network node device. In step 345, the joining node device transmits second network discovery signal 352, and in step 346, the in-network node device detects second network discovery signal 352. In step 347, the in-network node device transmits link information to the joining node device, such as listening schedule information for the in-network node device. In step 348, the joining node device receives the link information. In step 349, the joining node device adds the in-network node device to a neighbor table of the joining node device.

Example embodiments of the first listening schedule, the second listening schedule, and the hybrid listening schedule are described below in conjunction with FIGS. 3B-3D.

Figure 3B:
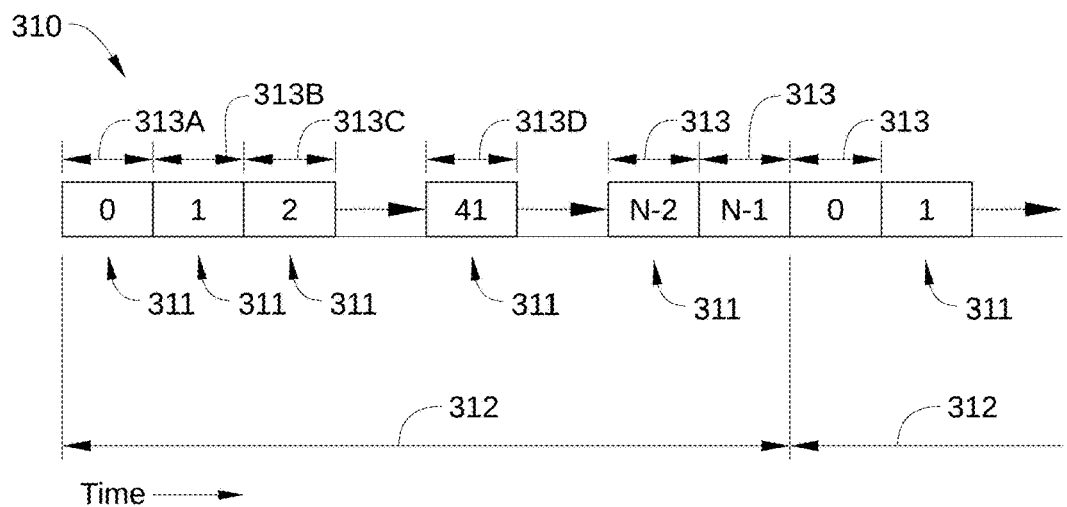
FIG. 3B is a diagram schematically illustrating a default-mode listening schedule, according to various embodiments.

FIG. 3B is a diagram schematically illustrating a default-mode listening schedule 310, according to various embodiments. Default-mode listening schedule 310 is a default channel-hopping sequence associated with a particular node device of a mesh network, such as node device 210 in FIG. 2. Thus, default-mode listening schedule 310 indicates a sequence of channels 311 that is followed by the transceiver of the particular node device using a protocol associated with a default physical layer mode of that particular node device. For example, default-mode listening schedule 310 can indicate the timing at which each channel 311 in a set of channels 311 (or frequency bands) associated with the default physical layer mode is employed in inter-node communications.

In the embodiment illustrated in FIG. 3B, default-mode listening schedule 310 is configured with an N-channel hop sequence of N different channels 311 (e.g., channels 0 to N−1) that are sequenced within an epoch 312. Each of the N different channels 311 is associated with a different specific slot 313 within an epoch 312. For example, channel 0 is employed for starting inter-node communications (e.g., listening and/or transmitting) during slot 313A, channel 1 is employed for starting inter-node communications during slot 313B, channel 2 is employed for starting inter-node communications during slot 313C, and so on. Once a particular epoch 312 expires, the N-channel hop sequence of channels 0 to N−1 then repeats as shown. Thus, a neighbor node device that has knowledge of default-mode listening schedule 310 can communicate with the node associate with default-mode listening schedule 310 via channels 0 to N−1.

Figure 3C:
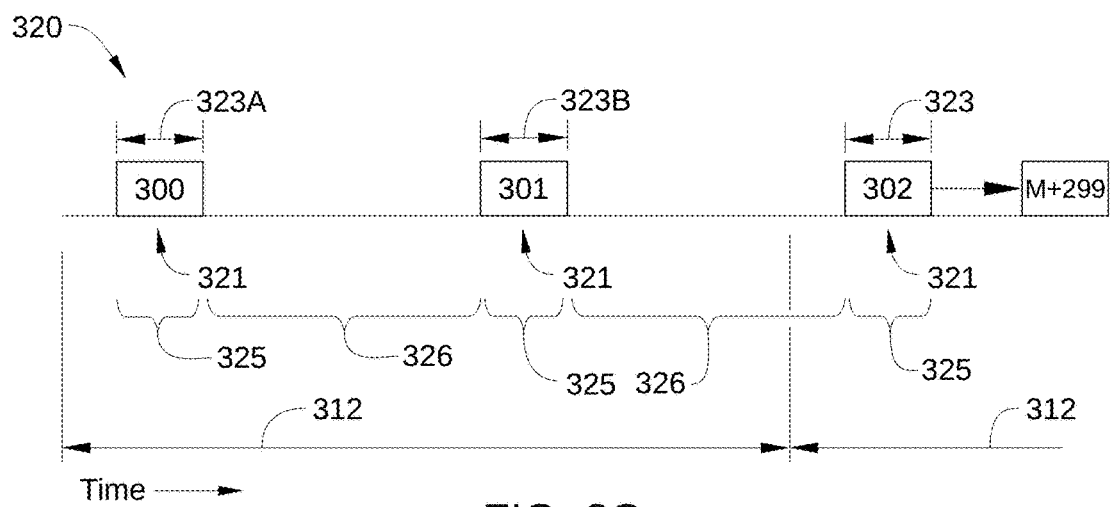
FIG. 3C is a diagram schematically illustrating a long-range-mode listening schedule, according to various embodiments.

FIG. 3C is a diagram schematically illustrating a long-range-mode listening schedule 320, according to various embodiments. Long-range-mode listening schedule 320 is a long-range channel-hopping sequence associated with a particular node device of a mesh network, such as node device 210 in FIG. 2. Thus, long-range-mode listening schedule 320 indicates a sequence of channels 321 that is followed by the transceiver of the particular node device using a protocol associated with a long-range physical layer mode of that particular node device. For example, long-range-mode listening schedule 320 can indicate the timing at which each channel 321 in a set of channels 321 (or frequency bands) associated with the long-range physical layer mode is employed in inter-node communications.

In some embodiments, the long-range physical layer mode of a particular node device differs from the default physical layer mode of the particular node device by at least one operating parameter. In such embodiments, when the node device employs the long-range physical layer mode, the at least one operating parameter is selected in the long-range physical layer mode to enable longer-range communications between the nodes. For example, in some embodiments, a data rate associated with the long-range physical layer mode for the particular node device is lower than a data rate associated with the default physical layer mode for the particular node device. Thus, in such embodiments, data transfer between two nodes employing the long-range physical layer mode is slower than data transfer between two nodes employing the default physical layer mode, but such data transfer can be performed reliably over a longer range and/or under noisier conditions.

In the embodiment illustrated in FIG. 3C, long-range-mode listening schedule 320 is configured with an M-channel hop sequence of M different channels 321 (e.g., channels 300 to M+299). Each of the M different channels 321 is associated with a different specific slot 323 of long-range-mode listening schedule 320. For example, channel 300 is employed for starting inter-node communications during slot 323A, channel 301 is employed for starting inter-node communications during slot 323B, and so on.

In some embodiments, the M channels 321 of long-range-mode listening schedule 320 are not interleaved in time with the N channels 311 of default-mode listening schedule 310 on a one-to-one basis. Instead, in such embodiments, a first portion of the M channels 321 of long-range-mode listening schedule 320 is associated with a first single epoch 312 of default-mode listening schedule 310, a second portion of the M channels 321 is associated with a second single epoch 312, a third portion of the M channels 321 is associated with a third single epoch 312, and so on. As a result, the M channels 321 may be sequenced across a large number of epochs 312 of default-mode listening schedule 310. For example, in an instance in which M=20 and every two channels 321 of long-range-mode listening schedule 320 are associated with a single epoch 312 of default-mode listening schedule 310, the M channels 321 of long-range-mode listening schedule 320 are distributed across ten epochs 312. In such an instance, the duty cycle of the long-range physical layer mode is relatively low. Therefore, the interleaving of the M channels 321 of long-range-mode listening schedule 320 with the N channels 311 of default-mode listening schedule 310 does not significantly affect the duty cycle of the default physical layer mode, which is the physical layer mode typically used for most communication by a node device. Alternatively or additionally, in some embodiments, the periodicity of the M channels 321 of long-range-mode listening schedule 320 is not linked to the duration of an epoch 312 of default-mode listening schedule 310. Thus, in such embodiments, the M channels 321 can be interleaved in any technically feasible pattern and not just a regular pattern. For example, in one embodiment, one channel 321 is associated with a slot 323 that occurs during one epoch 312, two channels 321 are associated with a slot 323 that occurs during the next epoch 312, zero channels 321 are associated with a slot 323 that occurs during the next epoch, three channels 321 are associated with a slot 323 that occurs during the next epoch 312, etc.

In the embodiment illustrated in FIG. 3C, for each slot 313 of the M channels 321 associated with long-range-mode listening schedule 320, there is an associated active period 325 and inactive period 326. In the active period 325 for a slot 313 associated with a particular channel 321, the transceiver of the node device listens on that particular channel 321. That is, the transceiver of the node device attempts to detect signals on the channel associated with the active period. By contrast, in the inactive period 326 of the slot 313 for the particular channel 321, the transceiver of the node device does not listen using the long-range physical layer mode. Further, in embodiments in which long-range-mode listening schedule 320 is incorporated into a hybrid listening schedule (described below in conjunction with FIG. 3D), the transceiver of the node device listens on one or more channels associated with slots 313 that correspond in time to that inactive period 326. For example, in the embodiment illustrated in FIG. 3C, during the inactive period 326 associated with channel 300, the transceiver of the node device listens on channels 1-41 (which are each associated with default-mode listening schedule 310) using the default physical layer mode.

In some embodiments, the set of channels 321 (or frequency bands) associated with the long-range physical layer mode includes a different set of frequency bands than the set of channels 311 (or frequency bands) associated with the default physical layer mode. In other embodiments, one or more of channels 321 can have one or more frequency bands that are the same as one or more channels 311. Alternatively or additionally, in some embodiments, the set of channels 321 associated with the long-range physical layer mode includes a different set of frequency bands than the set of channels 311 associated with the default physical layer mode. Alternatively or additionally, in some embodiments the duration of slots 323 associated with the long-range physical layer mode can be different than the duration of slots 313 associated with the default physical layer mode.

Figure 3D:
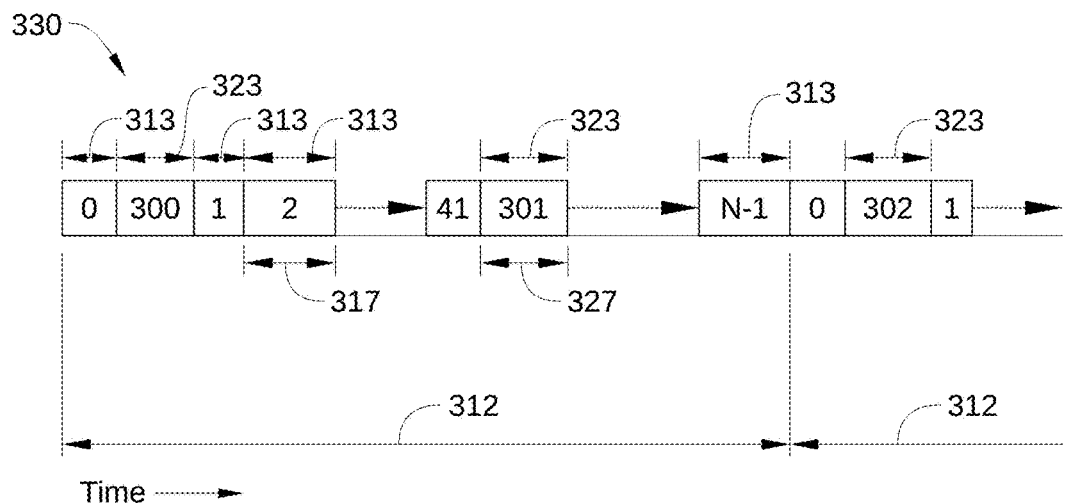
FIG. 3D is a diagram schematically illustrating a hybrid listening schedule, according to various embodiments.

FIG. 3D is a diagram schematically illustrating a hybrid listening schedule 330, according to various embodiments. Hybrid listening schedule 330 is time-multiplexed combination of default-mode listening schedule 310 (which is associated with the default physical layer mode of the node device) and long-range-mode listening schedule 320 (which is associated with the long-range physical layer mode of the node device). It is noted that in some mesh networks, a node device generally includes a single transceiver, and therefore the transceiver of the node device either transmits or receives network signals via the default physical layer mode or the long-range physical layer mode, but not both simultaneously. Consequently, slots 313 (for the N channels 311) of default-mode listening schedule 310 and slots 323 (for the M channels 321) of long-range-mode listening schedule 320 are interleaved in time, so that operation of the transceiver of the node device switches between a default physical layer mode and a long-range physical layer mode within each epoch 312 of hybrid listening schedule 330. For example, in the embodiment illustrated in FIG. 3D, slot 323A of long-range-mode listening schedule 320 occurs between slot 313A and slot 313B of default-mode listening schedule 310, slot 323B of long-range-mode listening schedule 320 occurs after slot 313D and the next subsequent slot (not shown) of default-mode listening schedule 310, and so on. Further, in the embodiment shown, the active period 325 of slots 323 temporally overlap one or more slots 313 of default-mode listening schedule 310. In such embodiments, the time interval associated with slots 323 is taken from one or more of the time intervals associated with slots 313. Thus, in such embodiments, in an epoch 312 of hybrid listening schedule 330 in which a particular slot 313 is temporally overlapped by a slot 323, the time interval associated with that particular slot 313 is reduced in duration compared to a time interval associated with that particular slot 313 in another epoch 312. Alternatively or additionally, in some embodiments, a particular slot 313 that is temporally overlapped by a slot 323 is completely overlapped in time. In such embodiments, the overlapped slot 313 is not employed in that particular epoch 312.

In some embodiments, a duration 327 of slots 323 is longer than a duration 317 of slots 313. In such embodiments, the longer duration 327 of slots 323 facilitates the longer time generally required to receive at least a header portion of a frame, packet, or other data unit from a neighbor node device. In such embodiments, duration 327 may be an integral multiple of duration 317, and/or a combined duration of active period 325 and inactive period 326 may be an integral multiple of duration 317. Alternatively, in some embodiments, duration 327 of slots 323 is substantially equal to duration 317 of slots 313. Generally, duration 317 is selected to be of a sufficient length that enables a node operating in default physical layer mode to recognize that a message from another node device is being received by the currently active channel of default-mode listening schedule 310. For example, the length of duration 317 can be selected based on a duration of a preamble of a discovery message (not shown) transmitted in a default physical layer mode. Similarly, duration 327 is selected to be of sufficient length that enables a node operating in long-range physical layer mode to recognize that a message from another node device is being received by the currently active channel of long-range-mode listening schedule 320. For example, the length of duration 327 can be selected based on a duration of a preamble of a discovery message (not shown) transmitted in a long-range physical layer mode.

In the embodiment described above in conjunction with FIGS. 3A-3C, a single listening schedule for a long-range physical layer mode is time-multiplexed with a listening schedule for a default physical layer mode. Thus, in such embodiments, operation of the transceiver of the node device can switch between the default physical layer mode and the long-range physical layer mode within each epoch 312 of default-mode listening schedule 310. In other embodiments, listening schedules for multiple long-range physical layer modes are time-multiplexed with the listening schedule for a default physical layer mode. In such embodiments, one or more slots for each long-range physical layer mode is interleaved with slots 313 of default-mode listening schedule 310. Thus, in such embodiments, operation of the transceiver of the node device switches between the default physical layer mode and the multiple long-range physical layer modes within each epoch 312 of default-mode listening schedule 310. Alternatively, in such embodiments, within some epochs 312, operation of the transceiver of the node device switches between the default physical layer mode and one of the multiple long-range physical modes, and within other epochs 312, operation of the node device switches between the default physical layer mode and another of the multiple long-range physical modes.

Figure 4:
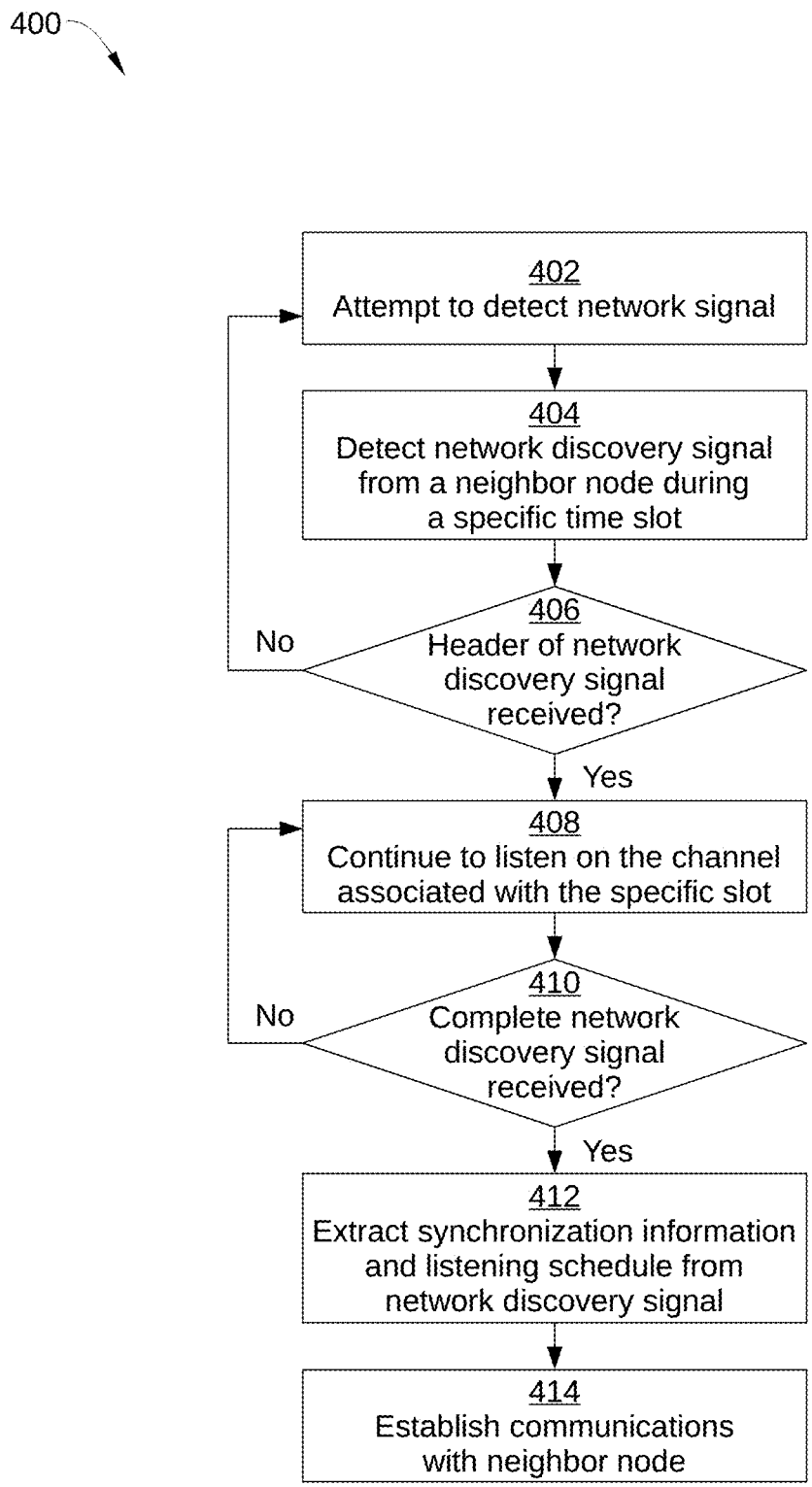
FIG. 4 is a flow diagram of method steps for a first node device to establish a communication link with a second node device, according to various embodiments.

FIG. 4 is a flow diagram of method steps for a first node device to establish a communication link with a second node device, according to various embodiments. In some embodiments, the first node device is a node device that is currently included in a mesh network, and the second node device is a node device that is attempting to join the mesh network. For example, the second node device may be a node device that is newly installed and/or initialized within range of one or more nodes included in the mesh network. Alternatively, the second node device may be a node device that was previously included in the mesh network, but has lost connection with the mesh network, for example due to changing noise levels, mesh network traffic levels, and/or environmental or other factors. For example, in one such instance, the second node was previously linked to the mesh network via communications using a default mode physical layer mode, and certain factors caused the link to be lost.

According to various embodiments, the second node can reestablish a link to the mesh network via one or more long-range physical layer modes, as described below.

Although the method steps are described with respect to the systems of FIGS. 1-3C, persons skilled in the art will understand that any system configured to perform the method steps, in any order, falls within the scope of the various embodiments.

As shown, a method 400 begins at step 402, where the transceiver of the node device 210 attempts to detect a network signal from neighbor node devices according to a hybrid listening schedule. The network signal can be a network discovery signal (described below in conjunction with FIGS. 5 and 6) or any other signal from a neighbor node device. In some embodiments, the node device employs hybrid listening schedule 330 in step 402. Thus, in such embodiments, operation of the node device switches between a default physical layer mode and a long-range physical layer mode, depending on whether a slot 313 of default-mode listening schedule 310 or a slot 323 of long-range-mode listening schedule 320 is currently indicated by hybrid listening schedule 330.

In step 404, node device 210 detects a network discovery signal, such as a network discovery frame, from a neighbor node device. To be detected, the network discovery signal is transmitted during a particular slot 313 or 323 of hybrid listening schedule 330 and via the channel that is associated with that particular slot 313 or 323, referred to hereinafter as the "receiving channel."

In step 406, node device 210 determines whether an initial portion of the network discovery frame has been received, such as a header portion that includes metadata associated with the network discovery frame. If yes, method 400 proceeds to step 408; if no, method 400 returns to step 402.

In step 408, node device 210 continues to listen on the channel associated with the specific slot 313 or 323 during which the network discovery signal is received in step 404. Thus, in some embodiments, node device 210 can halt attempts to detect network signals via hybrid listening schedule 330, and instead can continue to listen on the receiving channel. In so doing, the transceiver of the node device 210 continues to receive a remainder portion of the network discovery signal. For example, in some embodiments, the remainder portion of the network discovery signal includes synchronization information and/or listening schedule information associated with the neighbor node device.

In step 410, node device 210 determines whether the complete network discovery signal has been received. If yes, method 400 proceeds to step 412; if no, method 400 returns to step 408.

In step 412, node device 210 extracts synchronization information and listening schedule information from the network discovery signal. Based on such information, the node device 210 is enabled to communicate with the neighbor node device.

In step 414, node device 210 establishes communications with the neighbor node device. For example, in some embodiments, the joining device exchanges complete link information with the node device, thereby enabling future unicast communication links to be initiated to or from the joining device. In some embodiments, in step 414 node device 210 transmits synchronization and/or listening schedule information to the neighbor node device. In some embodiments, node device 210 establishes the communications with the neighbor node device via the same physical layer mode associated with the received network discovery signal. For example, when node device 210 detects the network discovery signal in step 404 during a slot 323 of hybrid listening schedule 330, which is associated with the long-range physical layer mode of node device 210, node device 210 establishes communications with the neighbor node device via the long-range physical layer mode. Conversely, when node device 210 detects the network discovery signal in step 404 during a slot 313 of hybrid listening schedule 330, which is associated with the default physical layer mode of node device 210, node device 210 establishes communications with the neighbor node device via the default physical layer mode.

In some embodiments, method 400 is performed continuously. Thus, in such embodiments, upon completion of step 414, method 400 returns to step 402. In other embodiments, method 400 is performed periodically, for example once every 12 hours, 24 hours, and/or the like. In such embodiments, steps 402-414 iterate for a predetermined time interval, e.g., 1 hour, before method 400 terminates. Alternatively or additionally, in some embodiments, method 400 is performed in response to a certain event, such as a restoration of power to node device 210, receipt of a notification from a neighbor node device or control center 130, and/or the like.

Discovery Operation Using Multiple Physical Layer Modes

In some embodiments, a node device performs a novel discovery operation that enables the node device to establish a link with a node included in a mesh network via a default physical layer mode when possible and via a long-range physical layer mode when necessary. Specifically, the discovery operation time-multiplexes transmission of a first network discovery signal associated with a first physical layer mode of the node device (for example a default mode) with transmission of a second network discovery signal associated with a second physical layer mode of the node device (for example a long-range mode). An example embodiment of network discovery signals transmitted via the novel discovery operation is described below in conjunction with FIGS. 5 and 6.

Figure 5:
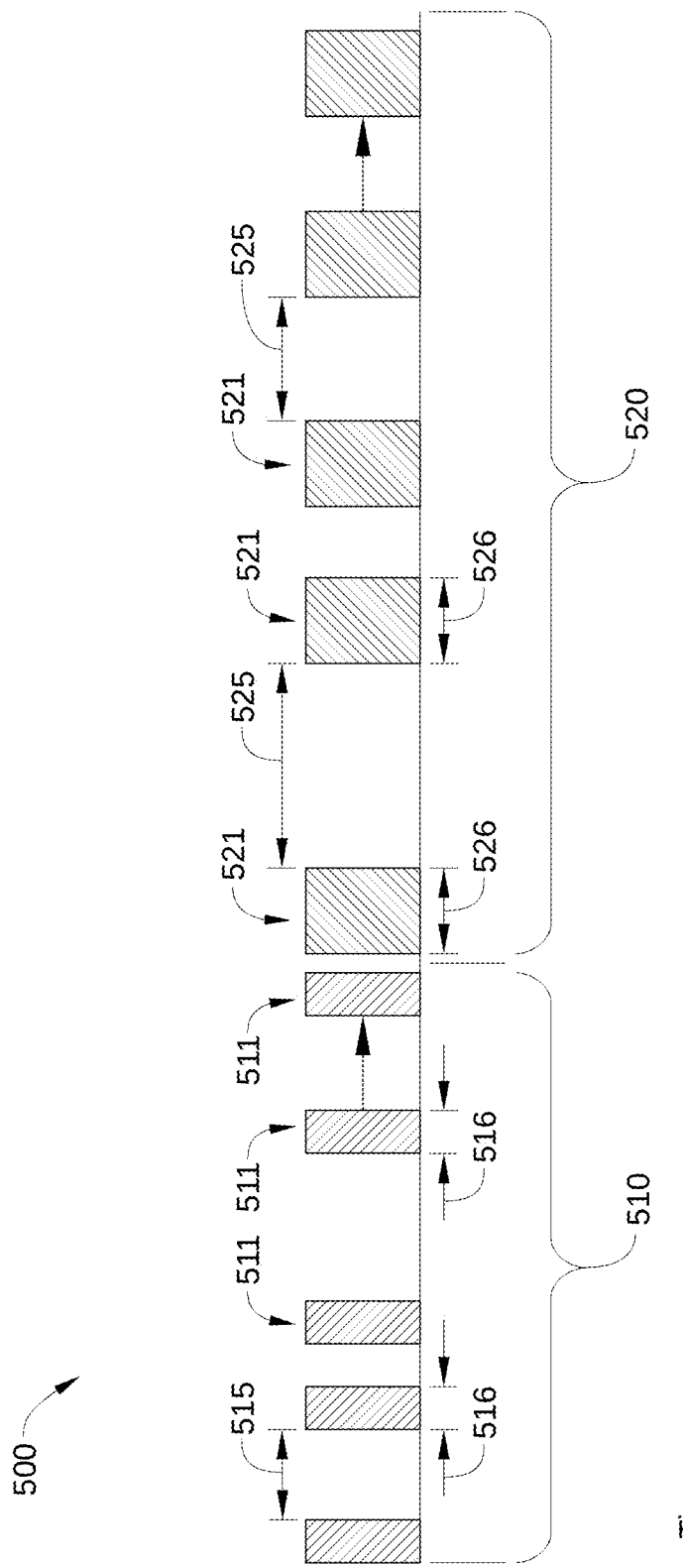
FIG. 5 is a diagram schematically illustrating a discovery operation for the node device of FIG. 2, according to various embodiments.

FIG. 5 is a diagram schematically illustrating a network discovery operation 500, according to various embodiments. In network discovery operation 500, a node device attempting to join a mesh network, referred to hereinafter as a "joining device," transmits network discovery signals, such as network discovery frames. In addition, the joining device transmits one or more network discovery signals using a default physical layer mode and one or more long-range physical layer modes. In the embodiment illustrated in FIG. 5, network discovery operation 500 includes a default mode discovery period 510 and a long-range mode discovery period 520. In default mode discovery period 510, the joining device transmits network discovery signals 511 via the default physical layer mode of the joining device, and in long-range mode discovery period 520, the joining device transmits network discovery signals 521 via the long-range physical layer mode of the joining device. Because in some mesh networks the joining device generally includes a single transceiver, the joining device either transmits network discovery signals via the default physical layer or the long-range physical layer mode, but not both simultaneously.

As shown, network discovery signals 511 are transmitted at random or semi-random times during default mode discovery period 510, so that, after a sufficient number of attempts, an initial portion of network discovery signal 511 coincides with a listening slot of a neighbor node device. Thus, in such embodiments, each of network discovery signals 511 is transmitted after a response period 515 has expired, where each response period 515 has a duration that is randomly or semi-randomly determined. For example, the duration of each response period 515 may be determined as function of a default mode slot time, such as a random integral multiple of the default mode slot time. As a result, there is sufficient delay between transmission of each network discovery signal 511 to ensure the joining device can detect a responding node from a nearby mesh network. In such embodiments, the default mode slot time may be based on one or more operating parameters of the default physical layer mode, such as data rate.

In some embodiments, each network discovery signal 511 of default mode discovery period 510 is transmitted via a different channel that is associated with the default physical layer mode of node devices included in the nearby mesh network. Thus, upon completion of default mode discovery period 510, a network discovery signal 511 can be transmitted using each channel that is associated with the default physical layer mode of node devices in the nearby mesh network. In other embodiments, in a single default mode discovery period 510, multiple network discovery signals 511 are transmitted for each different channel that is associated with the default physical layer mode of node devices included in the nearby mesh network. In such embodiments, upon completion of default mode discovery period 510, multiple network discovery signals 511 have been transmitted using each channel that is associated with the default physical layer mode.

In some embodiments, a plurality of default mode discovery periods 510 are performed in network discovery operation 500 before a first iteration of a long-range mode discovery period 520 is performed. In such embodiments, the lower-bandwidth communication links associated with a long-range physical layer mode may not be attempted (with one or more long-range mode discovery periods 520) until the likelihood of establishing a communication link via the default physical layer mode is determined to be less than a threshold value (multiple default mode discovery periods 510).

Network discovery signals 521 of long-range mode discovery period 520 are substantially similar to network discovery signals 511 of default mode discovery period 510, except that network discovery signals 521 are transmitted via a long-range physical layer mode of the joining device. For example, in some embodiments, network discovery signals 521 are transmitted at random or semi-random times during long-range mode discovery period 520. In addition, each of network discovery signals 521 is transmitted after a response period 525, where each response period has a duration that is randomly or semi-randomly determined. For example, the duration of each response period 525 may be determined as a function of a long-range mode slot time that may be based on one or more operating parameters of the long-range physical layer mode, such as data rate. In an embodiment, the function includes a random integral multiple of the long-range mode slot time. As a result, there is sufficient delay between transmission of each network discovery signal 521 to ensure the joining device can detect a responding node from a nearby mesh network. It is noted that the long-range mode slot time for the joining node can be significantly longer than the default mode slot time for the joining node. Further, in some embodiments, each network discovery signal 521 of long-range mode discovery period 520 is transmitted via a different channel that is associated with the long-range physical layer mode. Alternatively, in some embodiments, each different channel that is associated with the default physical layer mode is used to transmit multiple network discovery signals 521 in long-range mode discovery period 520.

In some embodiments, transmission of each network discovery signal 521 occurs over a longer time interval 526 than a time interval 516 employed for transmission of each network discovery signal 511. In such embodiments, this is generally due to node devices included in a mesh network typically listening via long-range physical layer mode with a lower duty cycle than via default physical layer mode. As a result, the probability is relatively small that the initial portion of a network discovery signal 521 transmitted by a joining node on a particular channel coincides with a slot for that particular channel of a long-range-mode listening schedule of a node device included in a mesh network. By comparison, the probability is much greater that the initial portion of a network discovery signal 511 transmitted by the joining node on a particular channel coincides with a slot for that particular channel of a default-mode listening schedule of the node device included in a mesh network. Consequently, in such embodiments, long-range mode discovery period 520 can have a longer duration than default mode discovery period 510. In some embodiments, the longer duration of long-range mode discovery period 520 may also be due in part to the slower data rate generally associated with the long-range physical layer mode of the joining device relative to the default physical layer mode of the joining device.

In the embodiment illustrated in FIG. 5, network discovery operation 500 includes a single default mode discovery period 510 followed by a single long-range mode discovery period 520. In other embodiments, network discovery operation 500 includes multiple default mode discovery periods 510 before one or more long-range mode discovery periods 520 occur. Further, in the embodiment illustrated in FIG. 5, transmission of network discovery signals 511 is performed in default mode discovery period 510 and transmission of network discovery signals 521 is performed in long-range mode discovery period 520. In other embodiments, transmission of network discovery signals 511 and network discovery signals 521 are interleaved, and occur throughout network discovery operation 500. Thus, in such embodiments, one or more network discovery signals 521 may be transmitted in network discovery operation 500 prior to some or all of network discovery signals 511.

Figure 6:
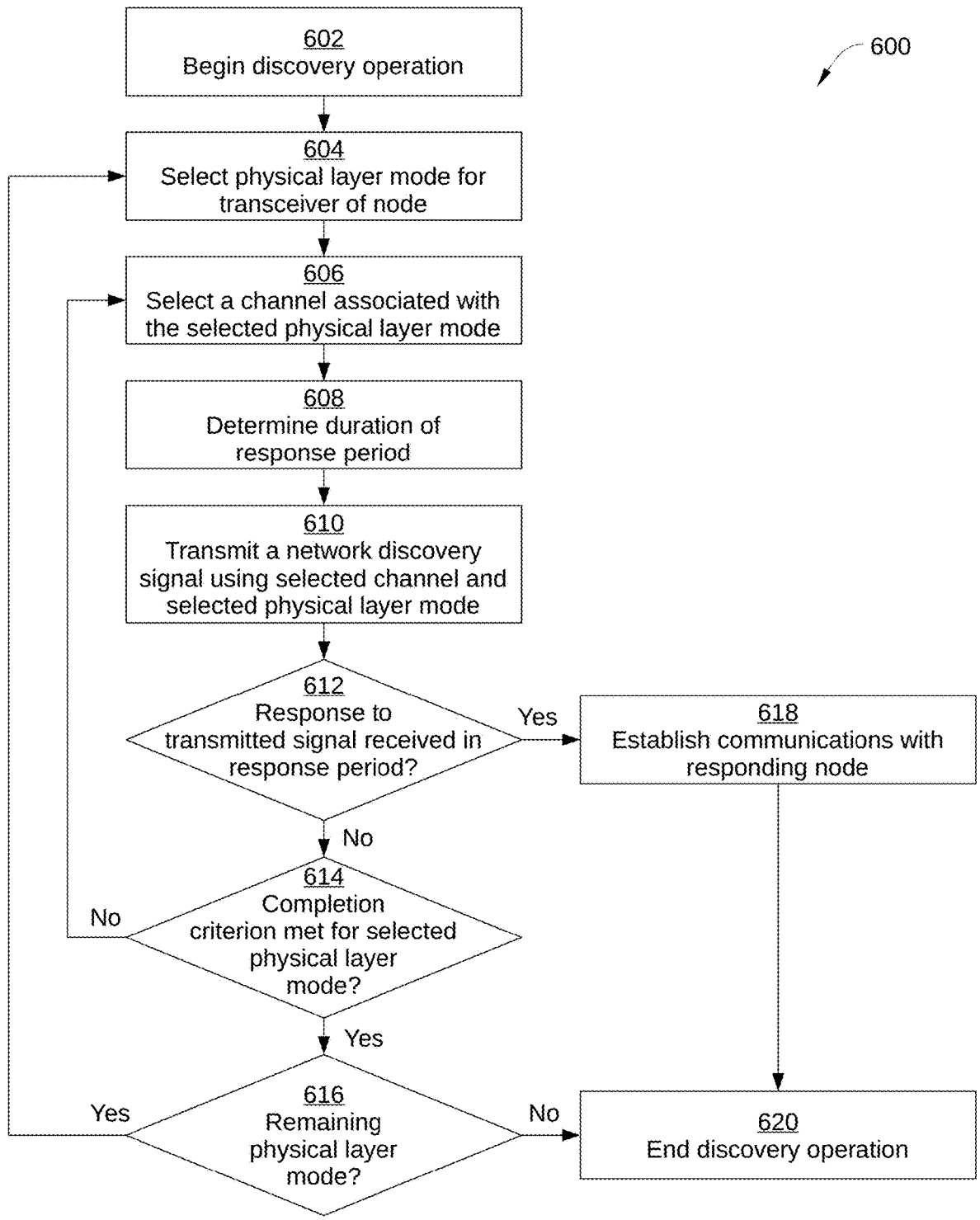
FIG. 6 is a flow diagram of method steps for a novel discovery operation that enables a node to establish a communication link with a node included in a mesh network, according to various embodiments.

FIG. 6 is a flow diagram of method steps for a novel discovery operation that enables a node to establish a communication link with a node included in a mesh network, according to various embodiments. Although the method steps are described with respect to the systems of FIGS. 1-5, persons skilled in the art will understand that any system configured to perform the method steps, in any order, falls within the scope of the various embodiments.

As shown, a method 600 begins at step 602, where a joining device begins a discovery operation, such as discovery operation 500. In some embodiments, the discovery operation is performed in response to the joining device being powered up or initialized, or whenever the joining device determines that there is no communication link established with a mesh network. Additionally or alternatively, in some embodiments, the discovery operation is performed periodically, for example once per day, twice per week, etc., so that additional communication links can be established with newly installed node devices and/or higher-bandwidth communications links can be established with existing device in the mesh network.

In step 604, the joining device selects a physical layer mode for the transceiver of the joining device. In some embodiments, the joining device is configured with a default physical layer mode and a long-range physical layer mode. In other embodiments, the joining device is configured with a default physical layer mode and multiple long-range physical layer modes. In such embodiments, each long-range physical layer mode differs from the other long-range physical layer modes by one or more operating parameters. Thus, each long-range physical layer mode provides a different trade-off between performance and range.

In some embodiments, in a first iteration of steps 604-616, the joining device selects a higher-performing physical layer mode in step 604, such as a default physical layer mode to start, for the transceiver of the joining device. In such embodiments, in subsequent iterations of steps 604-616, the joining device selects a lower-performing physical layer mode in step 604, such as a long-range physical layer mode. Thus, in such embodiments, the establishment of higher-bandwidth links is attempted prior to the establishment of lower-quality, longer range links.

In some embodiments, in a first iteration of steps 604-616, the joining device selects a most recently employed physical layer mode in step 604. Thus, in such embodiments, the joining device selects a physical layer mode based on previous interactions with one or more nodes of a nearby mesh network. In such embodiments, a joining device that has previously established communication links via a long-range physical layer mode selects that long-range physical layer mode in a first iteration of steps 604-616.

In step 606, the joining device selects a channel associated with the physical layer mode selected in step 604. In step 608, the joining device determines a duration of a response period for the network discovery signal to be transmitted. In step 610, the joining device transmits a network discovery signal, such as network discovery signal 511 or 521. In step 610, the joining device transmits the network discovery signal using the channel selected in step 606 and the physical layer mode selected in step 604.

In step 612, the joining device determines whether a response is received during the response period to the network discovery signal transmitted in step 610. When no response is received, method 600 proceeds to step 614; when a response is received, method 600 proceeds to step 618.

In step 614, the joining device determines whether one or more completion criteria for the selected physical layer mode have been met. Examples of different completion criteria include: the transmission of a network discovery signal for each channel associated with the selected physical layer mode; the transmission of a specified number of network discovery signals for each channel associated with the selected physical layer mode; the transmission of a total number network discovery signals using the selected physical layer mode; the transmission for a predetermined time interval of network discovery signals using the selected physical layer mode; the completion of a predetermined number of discovery periods associated with the selected physical layer mode (e.g., default mode discovery period 510 or long-range mode discovery period 520); and/or the like. When such a completion criterion is determined not to be met, method 600 returns to step 606 and another channel associated with the selected physical layer mode is selected. When such a completion criterion is determined to be met, method 600 proceeds to step 616.

In step 616, the joining device determines whether there are any remaining physical layer modes of the joining device that have not yet been used to send network discovery signals. When there is at least one remaining physical layer mode, method 600 returns to step 604 and another physical layer mode is selected. When there are no remaining physical layer modes, method 600 proceeds to step 620 and terminates.

In step 618, the joining device establishes communications with the node device that responded during the response period. For example, in some embodiments, the joining device exchanges complete link information with the node device, thereby enabling future unicast communications links to be initiated to or from the joining device. In step 620, the joining device terminates the current discovery operation.

1. In some embodiments, a method includes: attempting to detect, with a first transceiver associated with a first node, a network discovery signal from a second node, wherein the attempting is performed according to (a) a first listening schedule associated with a first physical layer mode and (b) a second listening schedule associated with a second physical layer mode; detecting, with the first transceiver, the network discovery signal during a slot associated with the first listening schedule; and in response to detecting the network discovery signal, establishing, with the first node, a connection between the first node and the second node using the first physical layer mode.

2. The method of clause 1, wherein the network discovery signal comprises at least a header portion of a network discovery frame.

3. The method of clauses 1 or 2, wherein the network discovery signal is received from the second node attempting to join a network that includes the first node.

4. The method of any of clauses 1-3, wherein the first physical layer mode comprises a first data rate and the second physical layer mode comprises a second data rate that is different than the first data rate.

5. The method of any of clauses 1-4, wherein the first physical layer mode comprises a first data rate and the second physical layer mode comprises a second data rate that is lower than the first data rate.

6. The method of any of clauses 1-5, wherein the second listening schedule includes a slot that has an active period in which the network discovery signal can be detected and an inactive period in which the network discovery signal cannot be detected.

7. The method of any of clauses 1-6, wherein each slot included in the second listening schedule has a respective active period in which the network discovery signal can be detected and a respective inactive period in which the network discovery signal cannot be detected.

8. The method of any of clauses 1-7, wherein the inactive period temporally overlaps one or more slots associated with the first listening schedule.

9. The method of any of clauses 1-8, wherein the active period has a longer duration than the slot associated with the first listening schedule.

10. The method of any of clauses 1-9, wherein: the first listening schedule comprises a first frequency-hopping sequence for a first set of frequency bands; the second listening schedule comprises a second frequency-hopping sequence for a second set of frequency bands; and the first set of frequency bands includes different frequency bands than the second set of frequency bands.

11. The method of any of clauses 1-10, wherein attempting to detect the network discovery signal according to the first listening schedule and the second listening schedule comprises attempting to detect the network discovery signal via a hybrid listening schedule that includes the first listening schedule and the second listening schedule.

12. In some embodiments, a method includes: transmitting, with a first transceiver of a first node, a first network discovery signal using a first physical layer mode of the first transceiver for a first time interval; upon expiration of the first time interval without receiving a response with the first transceiver to the first network discovery signal, transmitting, with the first transceiver, a second network discovery signal using a second physical layer mode of the first transceiver for a second time interval; and in response to the first transceiver receiving a response to the second network discovery signal from a second node, establishing, with the first transceiver, a connection between the first node and the second node using the second physical layer mode.

13. The method of clause 12, wherein: transmitting the first network discovery signal using the first physical layer mode comprises transmitting the first network discovery signal with a first data rate associated with the first physical layer mode; transmitting the second network discovery signal using the second physical layer mode comprises transmitting the second network discovery signal with a second data rate associated with the second physical layer mode; and the first data rate is different than the second data rate.

14. The method of clauses 12 or 13, wherein the first data rate is greater than the second data rate.

15. The method of any of clauses 12-14, wherein transmitting the first network discovery signal using the first physical layer mode for the first time interval comprises: transmitting for a first time, with the first transceiver, the first network discovery signal using the first physical layer mode; and upon expiration of a first response period without receiving a response to the first network discovery signal, transmitting for a second time, using the first transceiver, the first network discovery signal using the first physical layer mode.

16. The method of any of clauses 12-15, wherein transmitting the first network discovery signal for the first time comprises transmitting, with the first transceiver, the first network discovery signal via a first channel associated with the first physical layer mode, and transmitting the first network discovery signal for the second time comprises transmitting, with the first transceiver, the first network discovery signal via a second channel associated with the first physical layer mode.

17. The method of any of clauses 12-16, further comprising, upon expiration of a second response period without receiving a response via the second channel to the first network discovery signal, transmitting, with the first transceiver, the first network discovery signal via a third channel associated with the first physical layer mode, wherein the second response period has a different duration than the first response period.

18. The method of any of clauses 12-17, wherein the first response period is based on a random function.

19. The method of any of clauses 12-18, wherein transmitting the second network discovery signal using the second physical layer mode for the second time interval comprises: transmitting for a first time, with the first transceiver, the second network discovery signal using the second physical layer mode; and upon expiration of a second response period without receiving a response to the second network discovery signal, transmitting for a second time, using the first transceiver, the second network discovery signal using the second physical layer mode.

20 In some embodiments, a non-transitory computer readable medium stores instructions that, when executed by a processor, cause the processor to perform the steps of: attempting to receive, with a first transceiver associated with a first node, a network discovery signal from a second node, wherein the attempting is performed according to (a) a first channel-hopping sequence associated with a first physical layer mode and (b) a second channel hopping-sequence associated with a second physical layer mode; detecting, with the first transceiver, the network discovery signal during a slot associated with the first listening schedule; and in response to receiving the network discovery signal, establishing, with the first node, a connection between the first node and the second node using the first physical layer mode.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    attempting to detect, with a first transceiver associated with a first node, a network discovery signal from a second node, wherein the attempting is performed according to (a) a first listening schedule associated with a first physical layer mode and (b) a second listening schedule associated with a second physical layer mode;
    detecting, with the first transceiver, the network discovery signal during a slot associated with the first listening schedule; and
    in response to detecting the network discovery signal, establishing, with the first node, a connection between the first node and the second node using the first physical layer mode.

2. The method of claim 1, wherein the network discovery signal comprises at least a header portion of a network discovery frame.

3. The method of claim 1, wherein the network discovery signal is received from the second node attempting to join a network that includes the first node.

4. The method of claim 1, wherein the first physical layer mode comprises a first data rate and the second physical layer mode comprises a second data rate that is different than the first data rate.

5. The method of claim 1, wherein the first physical layer mode comprises a first data rate and the second physical layer mode comprises a second data rate that is lower than the first data rate.

6. The method of claim 5, wherein the second listening schedule includes a slot that has an active period in which the network discovery signal can be detected and an inactive period in which the network discovery signal cannot be detected.

7. The method of claim 6, wherein each slot included in the second listening schedule has a respective active period in which the network discovery signal can be detected and a respective inactive period in which the network discovery signal cannot be detected.

8. The method of claim 6, wherein the inactive period temporally overlaps one or more slots associated with the first listening schedule.

9. The method of claim 6, wherein the active period has a longer duration than the slot associated with the first listening schedule.

10. The method of claim 1, wherein:
    the first listening schedule comprises a first frequency-hopping sequence for a first set of frequency bands;
    the second listening schedule comprises a second frequency-hopping sequence for a second set of frequency bands; and
    the first set of frequency bands includes different frequency bands than the second set of frequency bands.

11. The method of claim 1, wherein attempting to detect the network discovery signal according to the first listening schedule and the second listening schedule comprises attempting to detect the network discovery signal via a hybrid listening schedule that includes the first listening schedule and the second listening schedule.

12. A method comprising:
    transmitting, with a first transceiver of a first node, a first network discovery signal using a first physical layer mode of the first transceiver for a first time interval;
    upon expiration of the first time interval without receiving a response with the first transceiver to the first network discovery signal, transmitting, with the first transceiver, a second network discovery signal using a second physical layer mode of the first transceiver for a second time interval; and
    in response to the first transceiver receiving a response to the second network discovery signal from a second node, establishing, with the first transceiver, a connection between the first node and the second node using the second physical layer mode.

13. The method of claim 12, wherein:
    transmitting the first network discovery signal using the first physical layer mode comprises transmitting the first network discovery signal with a first data rate associated with the first physical layer mode;
    transmitting the second network discovery signal using the second physical layer mode comprises transmitting the second network discovery signal with a second data rate associated with the second physical layer mode; and
    the first data rate is different than the second data rate.

14. The method of claim 13, wherein the first data rate is greater than the second data rate.

15. The method of claim 12, wherein transmitting the first network discovery signal using the first physical layer mode for the first time interval comprises:

transmitting for a first time, with the first transceiver, the first network discovery signal using the first physical layer mode; and upon expiration of a first response period without receiving a response to the first network discovery signal, transmitting for a second time, using the first transceiver, the first network discovery signal using the first physical layer mode.

16. The method of claim 15, wherein transmitting the first network discovery signal for the first time comprises transmitting, with the first transceiver, the first network discovery signal via a first channel associated with the first physical layer mode, and transmitting the first network discovery signal for the second time comprises transmitting, with the first transceiver, the first network discovery signal via a second channel associated with the first physical layer mode.

17. The method of claim 16, further comprising, upon expiration of a second response period without receiving a response via the second channel to the first network discovery signal, transmitting, with the first transceiver, the first network discovery signal via a third channel associated with the first physical layer mode, wherein the second response period has a different duration than the first response period.

18. The method of claim 15, wherein the first response period is based on a random function.

19. The method of claim 12, wherein transmitting the second network discovery signal using the second physical layer mode for the second time interval comprises:

transmitting for a first time, with the first transceiver, the second network discovery signal using the second physical layer mode; and upon expiration of a second response period without receiving a response to the second network discovery signal, transmitting for a second time, using the first transceiver, the second network discovery signal using the second physical layer mode.

20. A non-transitory computer readable medium storing instructions that, when executed by a processor, cause the processor to perform operations comprising:

attempting to receive, with a first transceiver associated with a first node, a network discovery signal from a second node, wherein the attempting is performed according to (a) a first channel-hopping sequence associated with a first physical layer mode and (b) a second channel hopping-sequence associated with a second physical layer mode;

detecting, with the first transceiver, the network discovery signal during a slot associated with the first channel-hopping sequence; and in response to receiving the network discovery signal, establishing, with the first node, a connection between the first node and the second node using the first physical layer mode.

* * * * *